United States Patent
Lin et al.

(10) Patent No.: US 10,547,782 B2
(45) Date of Patent: Jan. 28, 2020

(54) IMAGE SENSING APPARATUS

(71) Applicant: Industrial Technology Research Institute, Hsinchu (TW)

(72) Inventors: Jing-Yuan Lin, New Taipei (TW); Horn-Chin Lee, Hsinchu County (TW); Chia-Jung Chang, Hsinchu County (TW); Chih-Hao Hsu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 55 days.

(21) Appl. No.: 15/635,208

(22) Filed: Jun. 28, 2017

(65) Prior Publication Data

US 2018/0270418 A1    Sep. 20, 2018

(30) Foreign Application Priority Data

Mar. 16, 2017  (TW) .............................. 106108670 A

(51) Int. Cl.
*H04N 5/232* (2006.01)
*H04N 5/33* (2006.01)

(52) U.S. Cl.
CPC ......... *H04N 5/23245* (2013.01); *H04N 5/332* (2013.01)

(58) Field of Classification Search
CPC combination set(s) only.
See application file for complete search history.

(56) References Cited

U.S. PATENT DOCUMENTS 7,336,806 B2   2/2008   Schonberg et al.
7,720,264 B2   5/2010   Fouquet et al.
8,345,936 B2   1/2013   Burge et al.
(Continued)

FOREIGN PATENT DOCUMENTS

CN    102645741         8/2012
CN    102645741 A   *   8/2012   ................ G01J 3/26
(Continued)

OTHER PUBLICATIONS

Jafar M. H. Ali et al.,"An Iris Recognition System to Enhance E-security Environment Based on Wavelet Theory", AMO Advanced Modeling and Optimization, vol. 5, No. 2, Jan. 2003, pp. 93-104.
(Continued)

*Primary Examiner* — Jamie J Atala
*Assistant Examiner* — Michael Robert Cammarata
(74) *Attorney, Agent, or Firm* — JCIPRNET

(57) ABSTRACT

An image sensing apparatus including a light source, an image sensor, at least one lens, and a wavelength selecting device is provided. The light source is configured to emit an illumination light to irradiate an object. The image sensor is configured to receive a light signal from the object and send an image signal corresponding to the light signal. The at least one lens is located on a transmission path of the light signal and between the object and the image sensor. The wavelength selecting device is located on the transmission path of the light signal and between the object and the image sensor. The wavelength selecting device has a first reflector and a second reflector, and a gap exists between the first reflector and the second reflector. The gap is adapted to be adjusted to have a first predetermined optical path length or a second predetermined optical path length.

21 Claims, 6 Drawing Sheets

(56) References Cited

U.S. PATENT DOCUMENTS

| | | | |
|---|---|---|---|
| 8,913,119 B2 | 12/2014 | Choi et al. | |
| 9,465,988 B1* | 10/2016 | Marason | G06K 9/00604 |
| 2005/0237416 A1* | 10/2005 | Hasegawa | H04N 5/2254 |
| | | | 348/335 |
| 2007/0139760 A1 | 6/2007 | Baker et al. | |
| 2010/0185067 A1* | 7/2010 | Gupta | A61B 5/0097 |
| | | | 600/323 |
| 2010/0226029 A1* | 9/2010 | Funasaka | G02B 27/0006 |
| | | | 359/850 |
| 2012/0087645 A1* | 4/2012 | Wu | H04N 5/33 |
| | | | 396/439 |
| 2012/0235883 A1* | 9/2012 | Border | G02B 27/0093 |
| | | | 345/8 |
| 2013/0089240 A1 | 4/2013 | Northcott et al. | |
| 2013/0229646 A1* | 9/2013 | Sakurai | G01J 3/45 |
| | | | 356/51 |
| 2014/0084137 A1* | 3/2014 | de Groot | H01L 27/14625 |
| | | | 250/208.1 |
| 2014/0268344 A1* | 9/2014 | Arakawa | G01J 3/26 |
| | | | 359/580 |
| 2014/0307077 A1 | 10/2014 | Prabhakar | |
| 2015/0227790 A1 | 8/2015 | Smits | |
| 2015/0245767 A1 | 9/2015 | Northcott et al. | |
| 2015/0269419 A1 | 9/2015 | Bae et al. | |
| 2015/0381907 A1* | 12/2015 | Boettiger | H04N 5/332 |
| | | | 348/164 |
| 2016/0019421 A1 | 1/2016 | Feng et al. | |
| 2016/0210509 A1* | 7/2016 | Hanna | G06K 9/00604 |
| 2017/0034456 A1* | 2/2017 | Kyung | H04N 5/332 |
| 2017/0111557 A1* | 4/2017 | Ko | G02B 5/208 |
| 2017/0364736 A1* | 12/2017 | Ollila | G06K 9/00221 |
| 2018/0182069 A1* | 6/2018 | Xiong | G06T 3/4061 |

FOREIGN PATENT DOCUMENTS

| | | | |
|---|---|---|---|
| CN | 104394306 | | 3/2015 |
| CN | 206281994 U | * | 6/2017 |
| CN | 107037518 A | * | 8/2017 |
| TW | 201011350 | | 3/2010 |
| TW | M486820 | | 9/2014 |
| TW | 201640056 | | 11/2016 |

OTHER PUBLICATIONS

M. Ezhilarasan et al.,"Iris Recognition Based on Its Texture Patterns", International Journal on Computer Science and Engineering, vol. 02, No. 09, 2010, pp. 3071-3074.

S V Sheela et al.,"Iris Recognition Methods—Survey", International Journal of Computer Applications (0975-8887) vol. 3, No. 5, Jun. 2010, pp. 19-25.

Christopher Boyce et al.,"Multispectral Iris Analysis: A Preliminary Study",Computer Vision and Pattern Recognition Workshop,Jun. 17-22, 2006, pp. 1-9.

"Office Action of Taiwan Counterpart Application," dated Sep. 6, 2017, p. 1-p. 8, in which the listed references were cited.

* cited by examiner

IMAGE SENSING APPARATUS

CROSS-REFERENCE TO RELATED APPLICATION

This application claims the priority benefit of Taiwan application no. 106108670, filed on Mar. 16, 2017. The entirety of the above-mentioned patent application is hereby incorporated by reference herein and made a part of this specification.

TECHNICAL FIELD

The technical field relates to an image sensing apparatus.

BACKGROUND

As importance of network security and requirements for safety authentication of mobile payment have attracted increasing attention, and passwords which may bring annoying experience thus have been gradually abandoned, biological identification system relying on body features has been applied to provide the best protection.

Nevertheless, the existing fingerprint identification technology leads to problems such as relatively high threshold of obtaining patents, susceptibility to interference, and low accuracy. Hence, identification methods combined with optical authentication of biological features such as iris, veins, and fingerprints may provide a better chance of solving said problems. In commercially-available devices, additional infrared (IR) sensing modules (including IR cameras, IR light-emitting diode, and optical filters that allow near infrared (NIR) light to pass through) are adopted to enhance the quality of identification signals; however, manufacturing costs are raised, and additional space is needed by mobile phones.

In addition, IR cut-off filters in the existing camera modules may block the NIR light. Additional NIR camera modules are thus adopted by conventional technology for performing iris identification.

SUMMARY

An image sensing apparatus is introduced herein by the disclosure, so as to switch between a near infrared (NIR) light detection mode and a mode of not detecting the NIR light.

In an embodiment of the disclosure, an image sensing apparatus includes a light source, an image sensor, at least one lens, a wavelength selecting device, and an optical path length adjuster. The light source is configured to emit an illumination light to irradiate an object. The image sensor is configured to receive a light signal from the object and send an image signal corresponding to the light signal. The at least one lens is located on a transmission path of the light signal and between the object and the image sensor. The wavelength selecting device is located on the transmission path of the light signal and between the object and the image sensor. The wavelength selecting device has a first reflector and a second reflector, and a gap exists between the first reflector and the second reflector. The gap is adapted to be adjusted to have a first predetermined optical path length or a second predetermined optical path length. A transmittance of the wavelength selecting device for light having at least one predetermined wavelength range when the gap is adjusted to have the first predetermined optical path length is less than a transmittance of the wavelength selecting device for the light having the at least one predetermined wavelength range when the gap is adjusted to have the second predetermined optical path length. The predetermined wavelength range falls within a wavelength range of near infrared light and within a wavelength range of the illumination light. The optical path length adjuster is configured to adjust the gap to have the first predetermined optical path length or the second predetermined optical path length.

In the image sensing apparatus provided by the embodiments of the disclosure, the gap is adapted to be adjusted to have the first predetermined optical path length or the second predetermined optical path length. The transmittance of the wavelength selecting device for light having the predetermined wavelength range when the gap is adjusted to have the first predetermined optical path length is less than the transmittance of the wavelength selecting device for the light having the predetermined wavelength range when the gap is adjusted to have the second predetermined optical path length. The predetermined wavelength range falls in the wavelength range of the NIR light. Thereby, the image sensing apparatus provided by the embodiments of the disclosure may be switched between a NIR light detection mode and a mode of not detecting the NIR light, and an additional image sensing apparatus may not be adopted for detecting the NIR light. Costs are therefore effectively saved, and overall size of the electronic device is effectively reduced.

Several exemplary embodiments accompanied with figures are described in detail below to further describe the disclosure in details.

BRIEF DESCRIPTION OF THE DRAWINGS

The accompanying drawings are included to provide a further understanding, and are incorporated in and constitute a part of this specification. The drawings illustrate exemplary embodiments and, together with the description, serve to explain the principles of the disclosure.

DETAILED DESCRIPTION

Figure 1:
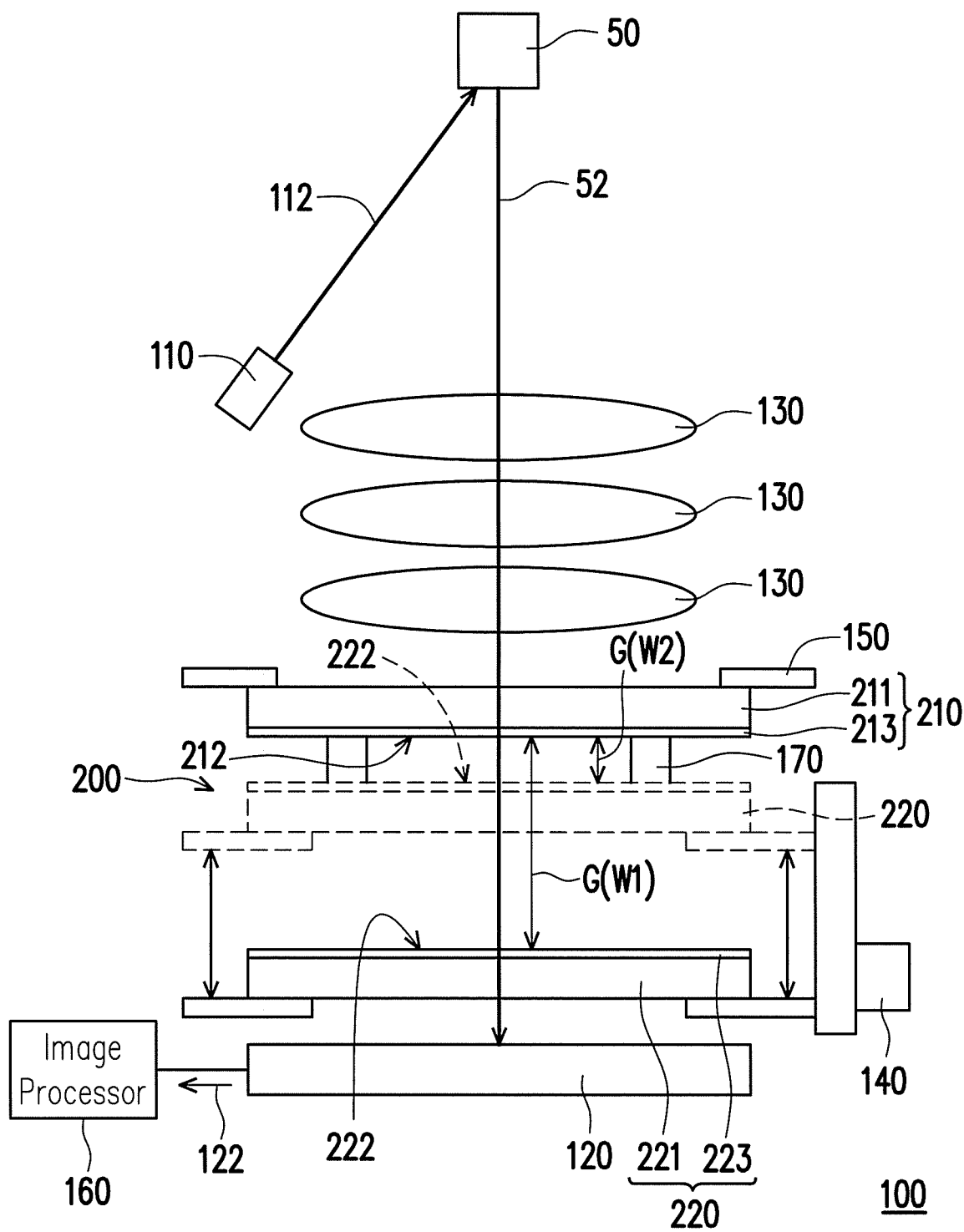
FIG. 1 is a schematic cross-sectional view of an image sensing apparatus according to an exemplary embodiment.

FIG. 1 is a schematic cross-sectional view of an image sensing apparatus according to an exemplary embodiment. Referring to FIG. 1, an image sensing apparatus 100 provided by the embodiment includes a light source 110, an image sensor 120, at least one lens 130 (a plurality of lenses 130 are shown in FIG. 1), a wavelength selecting device 200, and an optical path length adjuster 140. The light source 110 is configured to emit an illumination light 112, and the illumination light 112 irradiates an object 50. The embodiment provides that the light source 110 is, for example, a light-emitting diode (LED) or a laser diode, but the disclosure is not limited thereto.

The image sensor 120 is configured to receive a light signal 52 from the object 50 and send an image signal 122 corresponding to the light signal 52. The embodiment provides that the image sensor 120 is, for example, a complementary metal oxide semiconductor (CMOS) sensing device or a charge coupled device (CCD). The lenses 130 are located on a transmission path of the light signal 52 and between the object 50 and the image sensor 120. The embodiment provides that the lenses 130 may together constitute an imaging lens.

The wavelength selecting device 200 is located on the transmission path of the light signal 52 and between the object 50 and the image sensor 120. The wavelength selecting device 200 has a first reflector 210 and a second reflector 220, and a gap G exists between the first reflector 210 and the second reflector 220. The embodiment provides that the second reflector 220 is disposed between the first reflector 210 and the image sensor 120. The gap G is adapted to be adjusted to have a first predetermined optical path length or a second predetermined optical path length. The embodiment provides that the gap G is an air gap. The gap G is adapted to be adjusted to a first predetermined width W1 (i.e., the second reflector 220 is moved to the position illustrated by solid lines in FIG. 1) corresponding to the first predetermined optical path length or adjusted to a second predetermined width W2 (i.e., the second reflector 220 is moved to the position illustrated by dotted lines in FIG. 1) corresponding to the second predetermined optical path length. The embodiment provides that the second predetermined width W2 is less than the first predetermined width W1. Besides, the first predetermined optical path length is obtained by multiplying a refractive index of a medium (i.e., air in the embodiment) between the first reflector 210 and the second reflector 220 by the first predetermined width W1. The second predetermined optical path length is obtained by multiplying the refractive index of the medium (i.e., air in the embodiment) between the first reflector 210 and the second reflector 220 by the second predetermined width W2.

A transmittance of the wavelength selecting device 200 for light having a predetermined wavelength range when the gap G is adjusted to have the first predetermined optical path length is less than the transmittance of the wavelength selecting device 200 for the light having the predetermined wavelength range when the gap G is adjusted to have the second predetermined optical path length. The predetermined wavelength range falls within the wavelength range of near infrared (NIR) light and within a wavelength range of the illumination light 112. The embodiment provides that a center wavelength of the light having the predetermined wavelength range falls within a range from 760 nm to 1200 nm. In addition, a full width at half maximum (FWHM) of a spectrum of the light having the predetermined wavelength range is, for example, less than 50 nm, preferably less than 30 nm. Besides, the embodiment provides that both when the gap is adjusted to have the first predetermined optical path length and when the gap is adjusted to have the second predetermined optical path length, the wavelength selecting device 200 is pervious to visible light. The embodiment provides that the NIR light refers to, for example, light having a wavelength range from 750 nm to 1400 nm. Besides, the embodiment provides that a wavelength range of the illumination light 112 is, for example, from 750 nm to 1200 nm or, for example, from 830 nm to 870 nm, as long as the predetermined wavelength range is included.

Specifically, in the embodiment, when the gap G is adjusted to have the first predetermined optical path length, the transmittance of the wavelength selecting device 200 for the visible light is greater than or equal to 80%. Furthermore, when the gap G is adjusted to have the second predetermined optical path length, the transmittance of the wavelength selecting device 200 for the visible light may also be greater than or equal to 80%. The visible light refers to, for example, light having a wavelength range from 400 nm to 700 nm. Besides, in the embodiment, when the gap G is adjusted to have the first predetermined optical path length, the transmittance of the wavelength selecting device 200 for the NIR light is less than 10%, preferably less than 5%. Furthermore, in the embodiment, when the gap G is adjusted to have the second predetermined optical path length, a peak value of the transmittance of the wavelength selecting device 200 for the light having the predetermined wavelength range is greater than 30%.

Figure 2A:
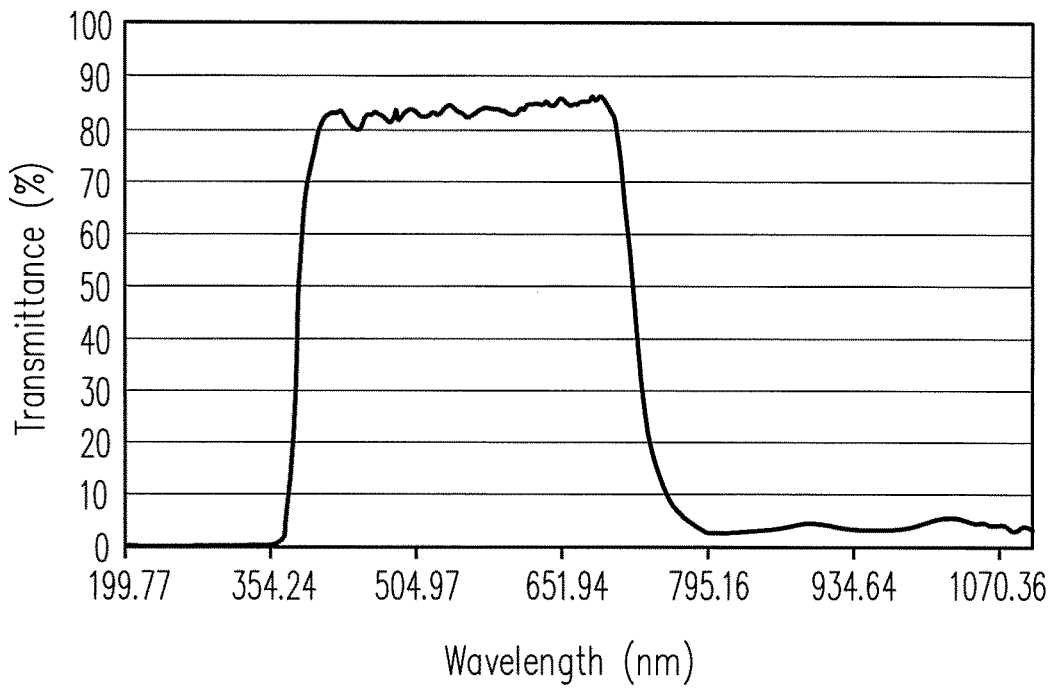
FIG. 2A illustrates a transmittance spectrum of the wavelength selecting device when the gap of the wavelength selecting device depicted in FIG. 1 is adjusted to have the first predetermined optical path length.
Figure 2B:
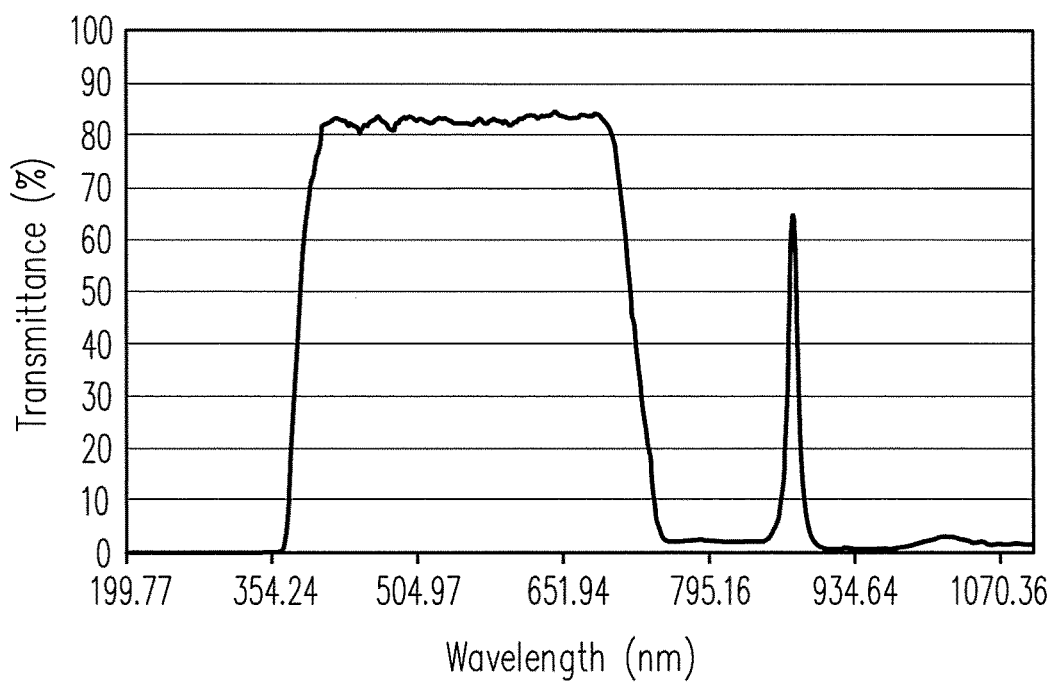
FIG. 2B illustrates a transmittance spectrum of the wavelength selecting device when the gap of the wavelength selecting device depicted in FIG. 1 is adjusted to have the second predetermined optical path length.

FIG. 2A illustrates a transmittance spectrum of the wavelength selecting device when the gap of the wavelength selecting device depicted in FIG. 1 is adjusted to have the first predetermined optical path. FIG. 2B illustrates a transmittance spectrum of the wavelength selecting device when the gap of the wavelength selecting device depicted in FIG. 1 is adjusted to have the second predetermined optical path length. Referring to FIG. 1 and FIG. 2A, when the gap G is adjusted to have the first predetermined optical path length (i.e., when the gap G has the first predetermined width W1), most of the visible light in the light signal 52 from the object 50 may penetrate the wavelength selecting device 200 and may be transmitted to the image sensor 120, and the NIR light in the light signal 52 barely penetrates the wavelength selecting device 200 and thus is barely transmitted to the image sensor 120. As such, under such circumstances, the image sensing apparatus 100 may be used for performing general photo-taking or filming functions. In addition, as the NIR light is barely transmitted to the image sensor 120, image quality obtained by photo-taking or filming may not be affected.

Referring to FIG. 1 and FIG. 2B, when the gap G is adjusted to have the second predetermined optical path length (i.e., when the gap G has the second predetermined width W2), most of the visible light in the light signal 52 from the object 50 may penetrate the wavelength selecting device 200 and may be transmitted to the image sensor 120. The light with the center wavelength in the predetermined wavelength range in the light signal 52 may also effectively penetrate the wavelength selecting device 200 and may be transmitted to the image sensor 120. As the light with the predetermined wavelength range (within the wavelength range of the NIR light) is conducive to performing biometric identification (e.g., iris identification), the image sensing apparatus 100 may act as an iris identifier under such circumstances. In other words, the object 50 is, for example, human eyes, and the light source 110 emits the illumination light 112 to the human eyes. As such, the light signal 52 reflected by the human eyes includes the NIR light including the light with the predetermined wavelength range. In an embodiment of the disclosure, the center wavelength of the light having the predetermined wavelength range is, for example, 850 nm or 810 nm and thus is suitable for performing iris identification.

In the embodiment, the wavelength selecting device 200 is an interference optical filter, in which the interference theory of light is adopted to select the penetrating wavelength. If it is assumed that the wavelength selecting device 200 is simplified as the simplest model, i.e., having two reflecting surfaces 212 and 222 facing the gap G, and that a width of the gap G is L, a refractive index of a medium in the gap G is n, and an angle of incidence of the light signal 52 entering the wavelength selecting device 200 is θ, the light that may penetrate the wavelength selecting device 200 (i.e., a light that may result in a constructive interference) satisfies $k\lambda=2$ nL·cos θ. Here, λ is a wavelength of light which is capable of penetrating the wavelength selecting device 200, and k is a positive integer. If the gap G has the first predetermined width W1, λ is greater than 1200 nm, which is beyond a sensing range of the image sensor 120 (e.g., a silicon image sensor) and may indicate that the image sensor 120 does not generate an image signal corresponding to an infrared (IR) light. Under such circumstances, the image sensing apparatus 100 may be used for general photo-taking or filming. If the gap G has the second predetermined width W2, λ in a NIR wave band falls within a range from 750 nm to 1200 nm, e.g., 850 nm or 810 nm. At the same time, the light having the predetermined wavelength range in the light signal 52 from the object 50 may penetrate the wavelength selecting device 200 and may thus be sensed by the image sensor 120, and the corresponding image signal 122 is generated. Therefore, the image sensing apparatus 100 may act as the iris identifier under such circumstances.

The embodiment provides that the first reflector 210 includes a transparent substrate 211 and a distributed Bragg reflective mirror 213 disposed on the transparent substrate 211. The second reflector 220 includes a transparent substrate 221 and a distributed Bragg reflective mirror 223 disposed on the transparent substrate 221. The transparent substrates 211 and 221 may be substrates (e.g., glass substrates) which is pervious to the visible light and the NIR light. Each of the distributed Bragg reflective mirrors 213 and 223, for example, has a plurality of film layers with alternating high refractive indexes and low refractive indexes. A material of the film layers may include metal, metal oxide, metal nitride, metal fluoride, silicon, silicon oxide, silicon nitride, silicon oxynitride, or a combination thereof. A reflective interface exists between two adjacent film layers. As such, comprehensive effects of each of the reflective interfaces should be taken into consideration for obtaining the wavelengths which generate constructive interference.

The optical path length adjuster 140 is configured to adjust the gap G to have the first predetermined optical path length or the second predetermined optical path length. The embodiment provides that the image sensing apparatus 100 further includes a fixing member 150. One of the first reflector 210 and the second reflector 220 (e.g., the first reflector 210) is fixed onto the fixing member 150. In an embodiment, the fixing member 150 is, for example, a housing. Besides, the embodiment provides that the optical path length adjuster 140 includes an actuator configured to drive the other one of the first reflector 210 and the second reflector 220 (e.g., the second reflector 220) to move relative to the one of the first reflector 210 and the second reflector 220 (e.g., relative to the first reflector 210). As such, the gap G is switched between having the first predetermined width W1 and having the second predetermined width W2.

In the image sensing apparatus 100 provided by the embodiment, the gap G is adapted to be adjusted to have the first predetermined optical path length or the second predetermined optical path length. The transmittance of the wavelength selecting device 200 for light having the predetermined wavelength range when the gap G is adjusted to have the first predetermined optical path length is less than the transmittance of the wavelength selecting device 200 for the light having the predetermined wavelength range when the gap G is adjusted to have the second predetermined optical path length. The predetermined wavelength range falls within the wavelength range of the NIR light. Thereby, the image sensing apparatus 100 provided by the embodiment may be switched between a NIR light detection mode and a mode of not detecting the NIR light, and an additional image sensing apparatus may not be required for detecting the NIR light. Costs are therefore effectively saved, and the overall size of the electronic device is effectively reduced. When the image sensing apparatus 100 is switched to the NIR light detection mode, the image sensing apparatus 100 in this embodiment may be used to perform the function of biometric identification. When the image sensing apparatus 100 is switched to the mode of not detecting the NIR light, the image sensing apparatus 100 may be used to perform the function of general photo-taking or filming and is able to obtain high-quality images.

In the embodiment, the image sensing apparatus 100 further includes an image processor 160 electrically connected to the image sensor 120 and configured to receive the image signal 122 sent by the image sensor 120. When the gap G is adjusted to have the second predetermined optical path length, the image processor 160 acquires a biometric signal. That is, the image signal 122 includes the biometric signal, for example, an iris image signal.

Figure 3:
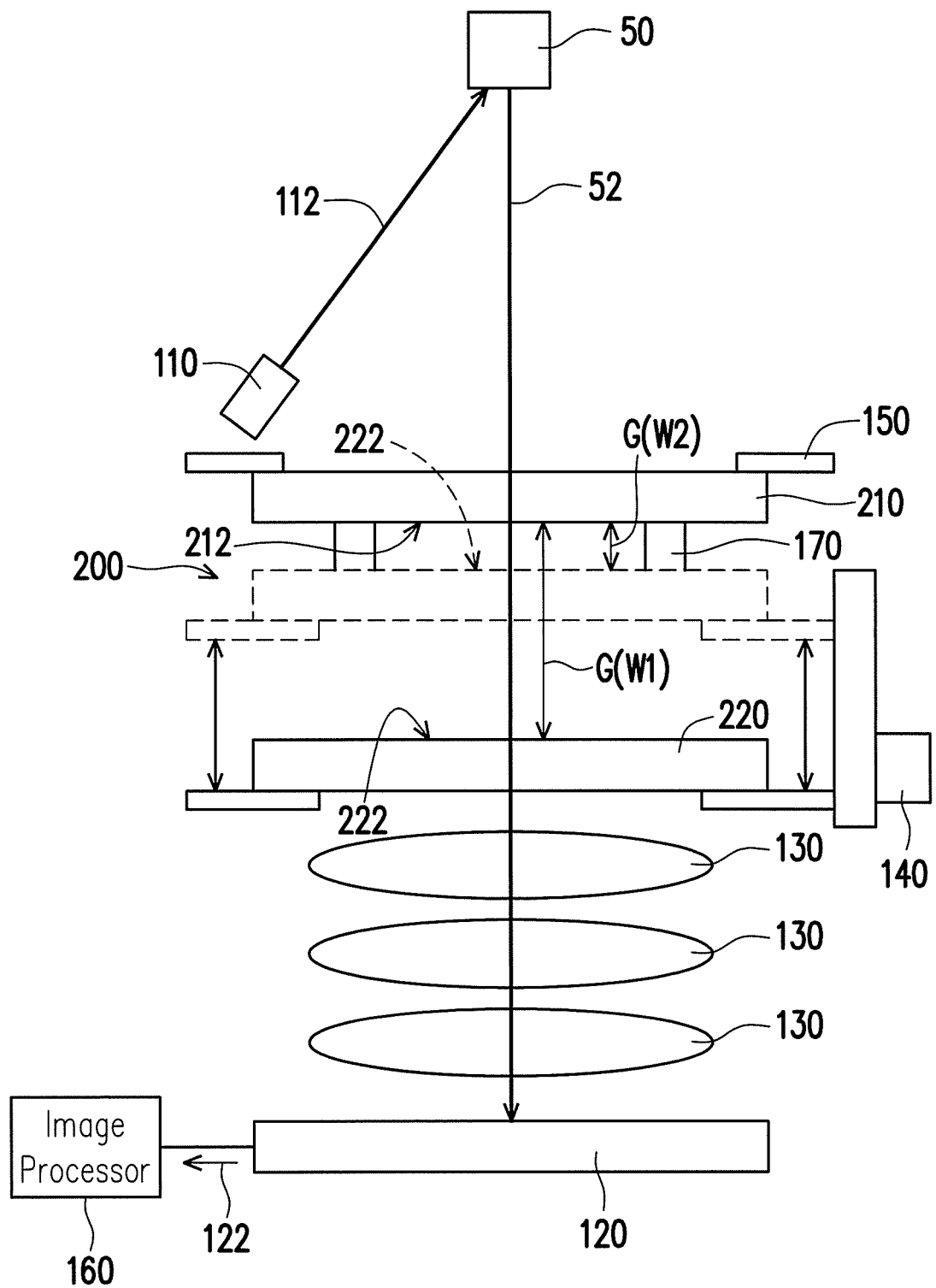
FIG. 3 is a schematic cross-sectional view of an variation of the image sensing apparatus in FIG. 1.

The embodiment provides that the wavelength selecting device 200 is located between the lenses 130 and the image sensor 120, as shown in FIG. 1. Nevertheless, other embodiments provide that the wavelength selecting device 200 may be located between the object 50 and the lenses 130, as shown in FIG. 3.

In the embodiment, the image sensing apparatus 100 further includes a spacer 170 disposed between the first reflector 210 and the second reflector 220. When the gap G is adjusted to have the second predetermined optical path length, both the first reflector 210 and the second reflector 220 are in contact with the spacer 170. In other words, the spacer 170 may be used to precisely determine the second predetermined width W2 of the gap G.

Figure 4:
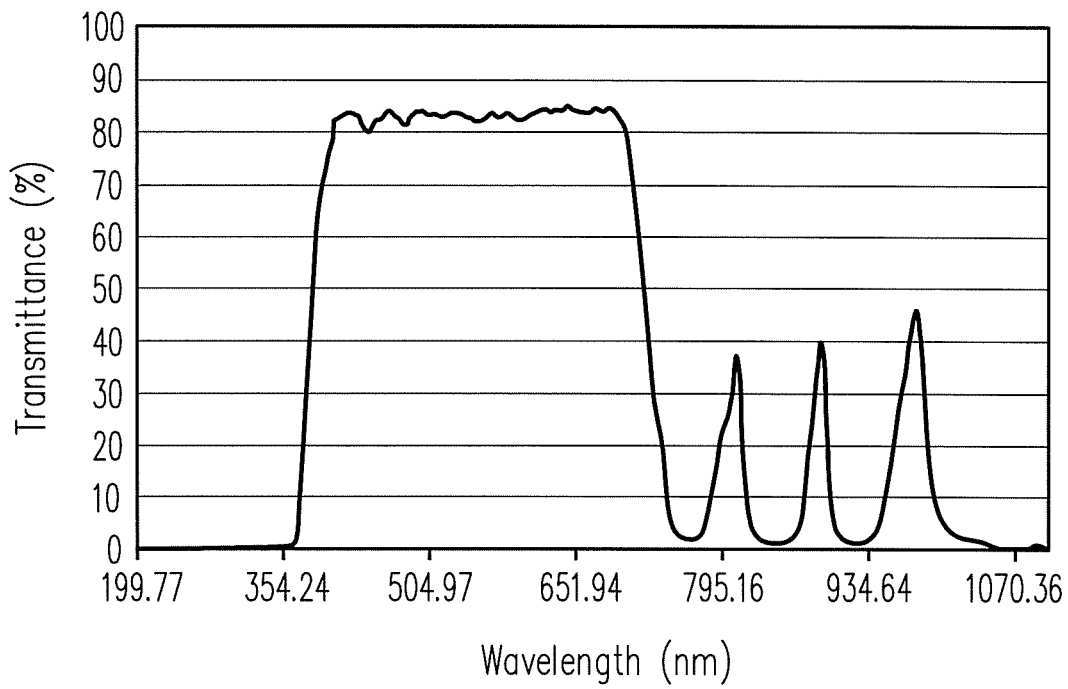
FIG. 4 illustrates a transmittance spectrum of the wavelength selecting device when the gap of the wavelength selecting device depicted in FIG. 1 is adjusted to have the second predetermined optical path length according to a modification example.

FIG. 4 illustrates a transmittance spectrum of the wavelength selecting device when the gap of the wavelength selecting device depicted in FIG. 1 is adjusted to have the second predetermined optical path length according to a modification example. Referring to FIG. 1 and FIG. 4, the number of the predetermined wavelength range is not limited by the disclosure. In FIG. 4, the embodiment provides that the number of the predetermined wavelength range may be plural (e.g., corresponding to the three peaks on the right side of the visible light wave band in FIG. 4) through the film layer design of the distributed Bragg reflective mirrors of the first reflector 210 and the second reflector 220. The predetermined wavelength ranges also fall in the wavelength range of the NIR light. In an embodiment of the disclosure, each of the center wavelengths of lights respectively having the predetermined wavelength ranges falls in a range between 760 nm and 1200 nm. Moreover, each of the FWHMs of spectra of the lights respectively having the predetermined wavelength ranges is less than 50 nm, preferably less than 30 nm. Besides, the embodiment provides that when the gap G is adjusted to have the first predetermined optical path length, the transmittance spectrum of the wavelength selecting device 200 is similar to what is shown in FIG. 2A, i.e., the transmittance of the NIR light is considerably low (e.g., lower than 10%). When the gap G is adjusted to have the second predetermined optical path length, a peak value of each of the transmittances of the wavelength selecting device 200 for the lights respectively having the predetermined wavelength ranges is greater than 30%. Besides, the biological features that may be sensed by the image sensing apparatus 100 are not limited to the iris image; vein patterns, for example, may also be sensed, or the image sensing apparatus 100 may be used to measure blood glucose as well. For example, when the center wavelength of the light having the predetermined wavelength range is, for example, at least one of 760 nm, 850 nm, 890 nm, and 960 nm, the vein patterns may be easily measured; in particular, the center wavelength at 760 nm or 960 nm is even more suitable for vein pattern measurement. In addition, when the center wavelength of the light having the predetermined wavelength range is, for example, at least one of 760 nm, 850 nm, and 940 nm, the image sensing apparatus 100 is suitable for measuring blood glucose. When the center wavelength of the light having the predetermined wavelength range is, for example, at least one of 880 nm, 895 nm, 905 nm, and 940 nm, the image sensing apparatus 100 is suitable for measuring blood oxygen.

Figure 5:
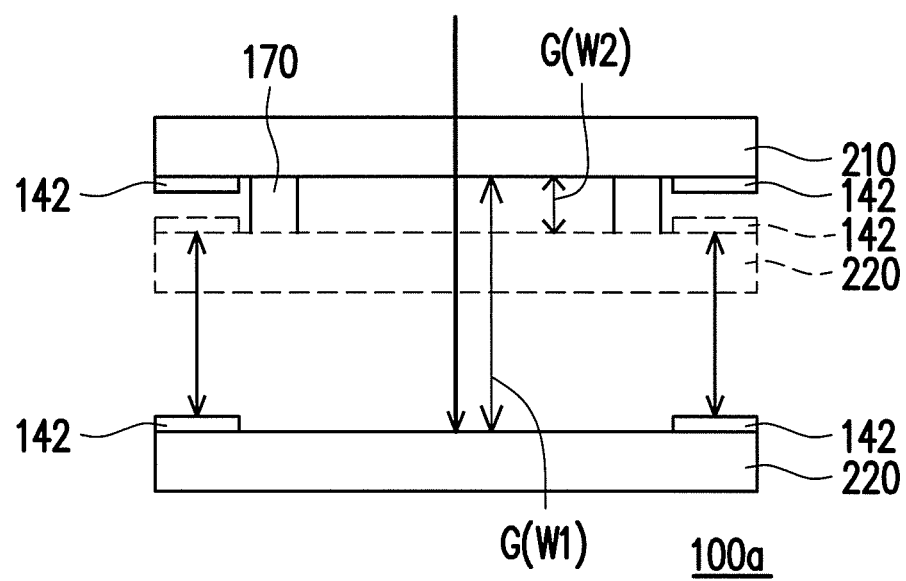
FIG. 5 is a schematic cross-sectional view of a portion of an image sensing apparatus according to another exemplary embodiment.

FIG. 5 is a schematic cross-sectional view of a portion of an image sensing apparatus according to another exemplary embodiment. The image sensor 120, the image processor 160, and the lenses 130 are not shown in FIG. 5. Referring to FIG. 5, an image sensing apparatus 100a in the embodiment is similar to the image sensing apparatus 100 in FIG. 1, and differences therebetween are described as follows. The embodiment provides that the optical path length adjuster 140 includes a plurality of electrodes 142 disposed on the first reflector 210 and the second reflector 220, and the electrodes 142 are configured to move the other one of the first reflector 210 and the second reflector 220 (e.g., move the second reflector 220) through an electrostatic force. For instance, a voltage may be applied to the electrodes 142, such that the electrodes 142 on the first reflector 210 and the electrodes 142 on the second reflector 220 may have the same or opposite polarities, and that a repulsion force or an attraction force is generated. As such, the gap G is switched between the first predetermined width W1 and the second predetermined width W2.

Figure 6:
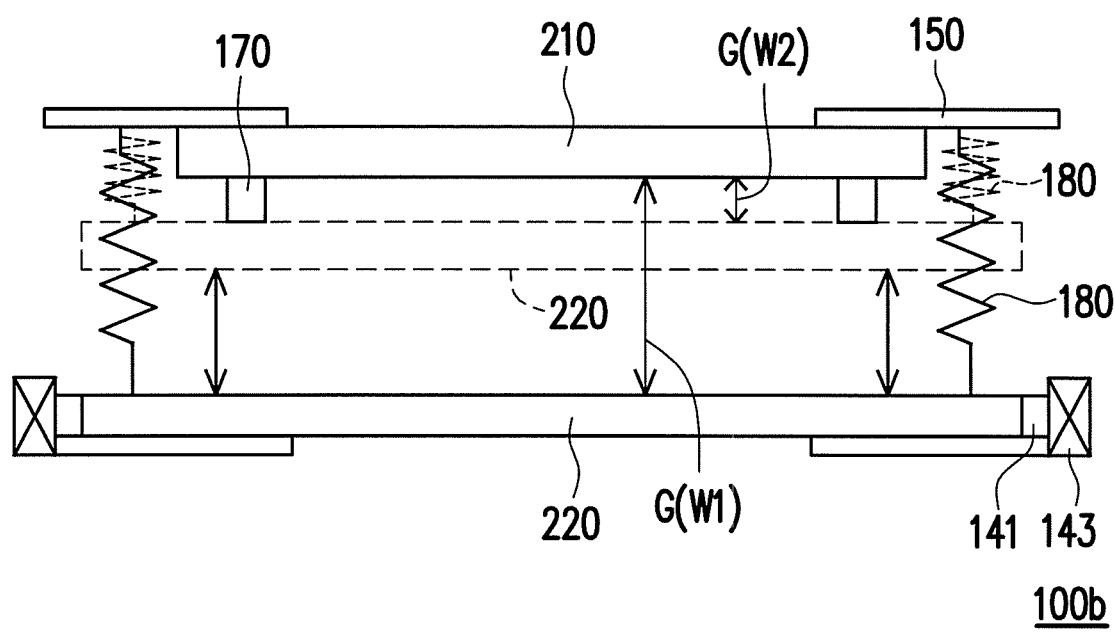
FIG. 6 is a schematic cross-sectional view of a portion of an image sensing apparatus according to yet another exemplary embodiment.

FIG. 6 is a schematic cross-sectional view of a portion of an image sensing apparatus according to still another exemplary embodiment. The image sensor 120, the image processor 160, and the lenses 130 are not shown in FIG. 6. Referring to FIG. 6, an image sensing apparatus 100b in the embodiment is similar to the image sensing apparatus 100 in FIG. 1, and differences therebetween are described as follows. The image sensing apparatus 100b provided by the embodiment further includes at least one elastic member 180 (a plurality of elastic members 180 are shown in FIG. 6) connecting the other one of the first reflector 210 and the second reflector 220 (e.g., the second reflector 220) with the fixing member 150. The embodiment provides that the elastic member 180 is, for example, a spring. Nevertheless, other embodiments provide that the elastic member 180 may also be an elastic sheet or other types of elastic members. In addition, other embodiments provide that the optical path length adjuster 140 includes a magnetic material 141 and a coil 143. The magnetic material 141 is disposed on the other one of the first reflector 210 and the second reflector 220 (e.g., disposed on the second reflector 220). The coil 143 is configured to generate a magnetic force on the magnetic material 141 by means of applying a current through the coil 143, so as to move the other one of the first reflector 210 and the second reflector 220 (e.g., move the second reflector 220). For instance, the elastic restoring force of the elastic member 180 may change the gap G from the second predetermined width W2 to the first predetermined width W1, and the magnetic repulsive force of the coil 143 may change the gap G from the first predetermined width W1 to the second predetermined width W2. Besides, in the embodiment, a size of the first reflector 210 may be different from a size of the second reflector 220.

Figure 7A:
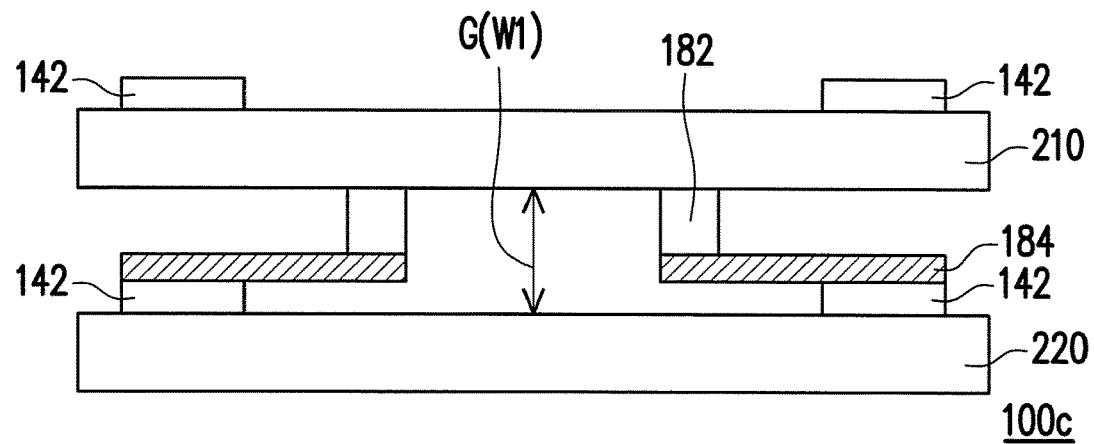
FIG. 7A and FIG. 7B are schematic cross-sectional views of a portion of an image sensing apparatus in two different states according to still another exemplary embodiment.
Figure 7B:
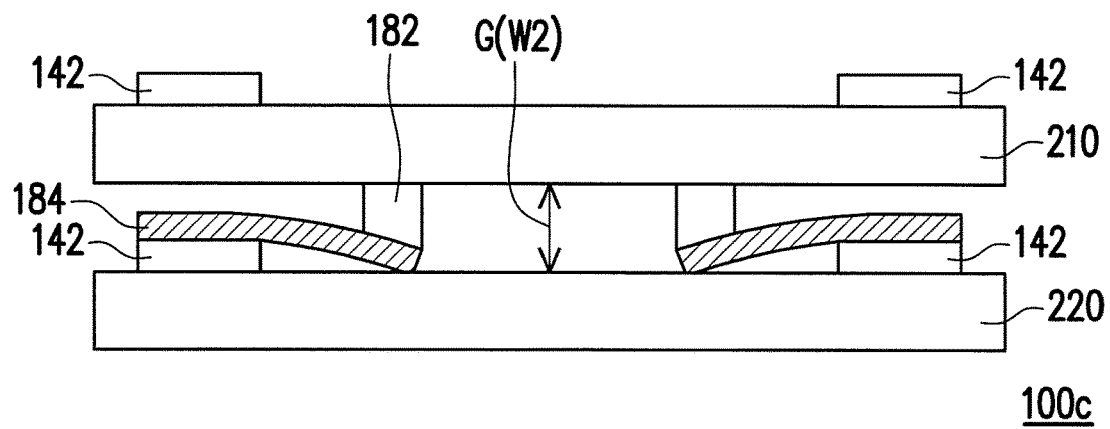

FIG. 7A and FIG. 7B are schematic cross-sectional views of a portion of an image sensing apparatus in two different states according to still another exemplary embodiment. The image sensor 120, the image processor 160, and the lenses 130 are not shown in FIG. 7 and FIG. 7B. Referring to FIG. 7A and FIG. 7B, an image sensing apparatus 100c in the embodiment is similar to the image sensing apparatus 100a in FIG. 5, and differences therebetween are described as follows. The image sensing apparatus 100c provided by the embodiment further includes at least one bump 182 (a plurality of bumps 182 are shown in FIG. 7A and FIG. 7B) and at least one elastic member 184 (a plurality of elastic members 184 are shown in FIG. 7A and FIG. 7B). The bumps 182 are disposed on one of the first reflector 210 and the second reflector 220 (e.g., on the first reflector 210), and the elastic members 184 connect the other one of the first reflector 210 and the second reflector 220 (e.g., the second reflector 220) with the bumps 182. The embodiment provides that the elastic members 184 are, for example, elastic sheets. When the polarity of the electrodes 142 on the first reflector 210 is opposite to the polarity of the electrodes 142 on the second reflector 220, the elastic sheets are bent. As such, the gap G between the first reflector 210 and the second reflector 220 shrinks, such that the gap G having the first predetermined width W1 (as shown in FIG. 7A) is adjusted to have the second predetermined width W2 (as shown in FIG. 7B). A size of the second predetermined width W2 is determined by the thickness of the bump 182 and the thickness of the elastic member 184. The electrodes 142 provided by the embodiment may also be replaced by coils, electromagnets, or magnetic members, and the coils, electromagnets, or magnetic members on the first reflector 210 and on the second reflector 220 generate an attraction force through the magnetic force. In addition, when no electrostatic force exists among the electrodes 142, the elastic restoring force of the elastic sheets drives the gap G from the second predetermined width W2 (as shown in FIG. 7B) to the first predetermined width W1 (as shown in FIG. 7A).

Figure 8:
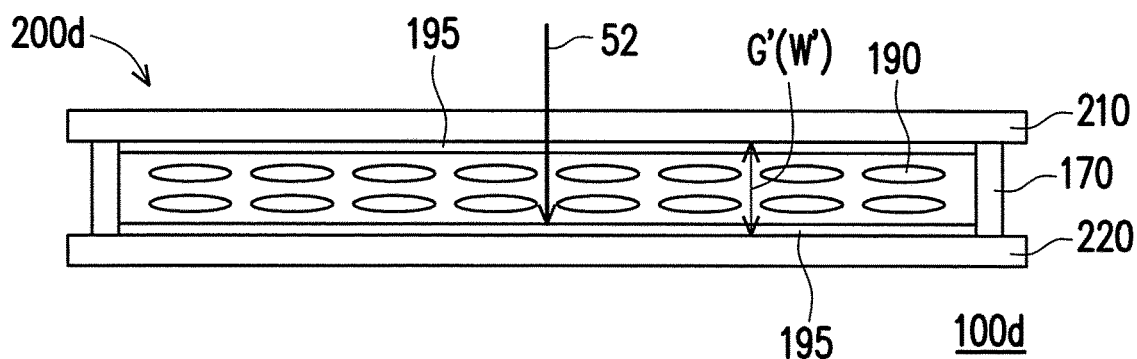
FIG. 8 is a schematic cross-sectional view of a portion of an image sensing apparatus according to another exemplary embodiment.

FIG. 8 is a schematic cross-sectional view of a portion of an image sensing apparatus according to another exemplary embodiment. The image sensor 120, the image processor 160, and the lenses 130 are not shown in FIG. 8. Referring to FIG. 8, an image sensing apparatus 100d in the embodiment is similar to the image sensing apparatus 100 in FIG.

1, and differences therebetween are described as follows. In the image sensing apparatus 100d provided by the embodiment, a gap G' of a wavelength selecting device 200d is a liquid crystal gap filled with liquid crystal 190. A refractive index of the liquid crystal gap for the light signal 52 is adapted to be switched to a first refractive index corresponding to the first predetermined optical path length or to a second refractive index corresponding to the second predetermined optical path length. The optical path length adjuster 140 includes two electrodes 195 located on two sides of the liquid crystal gap G', and the electrodes 195 are configured to change the refractive index of the liquid crystal gap G' to the first refractive index or the second refractive index through applying a voltage. The embodiment provides that the gap G' has a width W'. The width W' may be determined by the spacer 170 located between the first reflector 210 and the second reflector 220. The first predetermined optical path length is calculated by multiplying the width W' by the first refractive index. The second predetermined optical path length is calculated by multiplying the width W' by the second refractive index. The second refractive index is less than the first refractive index. Thereby, similar to the interference theory of light illustrated in the embodiments of FIG. 1, when the gap G' is adjusted to have the first predetermined optical path length, the NIR light may barely penetrate the wavelength selecting device 200d. When the gap G' is adjusted to have the second predetermined optical path length, the light having the predetermined wavelength range may effectively penetrate the wavelength selecting device 200d.

To sum up, in the image sensing apparatus provided by the embodiments of the disclosure, the gap is adapted to be adjusted to have the first predetermined optical path length or the second predetermined optical path length. The transmittance of the wavelength selecting device for the light having the predetermined wavelength range when the gap is adjusted to have the first predetermined optical path length is less than the transmittance of the wavelength selecting device for the light having the predetermined wavelength range when the gap is adjusted to have the second predetermined optical path length. The predetermined wavelength range falls within the wavelength range of the NIR light. Thereby, the image sensing apparatus provided by the embodiments of the disclosure may be switched to the NIR light detection mode or to the mode of not detecting the NIR light, and an additional image sensing apparatus may not be adopted for detecting the NIR light. Costs are therefore effectively saved, and the overall size of the electronic device is effectively reduced.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An image sensing apparatus, comprising:
    a light source, configured to emit an illumination light, wherein the illumination light irradiates an object;
    an image sensor, configured to receive a light signal from the object and send an image signal corresponding to the light signal;
    at least one lens, located on a transmission path of the light signal and between the object and the image sensor;
    a wavelength selecting device, located on the transmission path of the light signal and between the object and the image sensor, the wavelength selecting device having a first reflector and a second reflector, a gap existing between the first reflector and the second reflector, wherein the gap is adapted to be adjusted to have a first predetermined optical path length or a second predetermined optical path length, and a transmittance of the wavelength selecting device for light having at least one predetermined wavelength range when the gap is adjusted to have the first predetermined optical path length is less than a transmittance of the wavelength selecting device for the light having the at least one predetermined wavelength range when the gap is adjusted to have the second predetermined optical path length, wherein the predetermined wavelength range falls within a wavelength range of near infrared light and within a wavelength range of the illumination light;
    wherein both when the gap is adjusted to have the first predetermined optical path length and when the gap is adjusted to have the second predetermined optical path length, the wavelength selecting device is pervious to an entire visible light band and allows the entire visible light band to pass through simultaneously, and wherein the entire visible light band ranges from 400 nm to 700 nm; and
    an optical path length adjuster, configured to adjust the gap to have the first predetermined optical path length or the second predetermined optical path length.

2. The image sensing apparatus as claimed in claim 1, further comprising an image processor configured to receive the image signal sent by the image sensor, wherein when the gap is adjusted to have the second predetermined optical path length, the image processor acquires a biometric signal.

3. The image sensing apparatus as claimed in claim 1, wherein the gap is an air gap.

4. The image sensing apparatus as claimed in claim 3, wherein the gap is adapted to be adjusted to a first predetermined width corresponding to the first predetermined optical path length or adjusted to a second predetermined width corresponding to the second predetermined optical path length.

5. The image sensing apparatus as claimed in claim 4, wherein the second predetermined width is less than the first predetermined width.

6. The image sensing apparatus as claimed in claim 3, further comprising a fixing member, wherein one of the first reflector and the second reflector is fixed onto the fixing member.

7. The image sensing apparatus as claimed in claim 6, wherein the optical path length adjuster comprises an actuator configured to drive the other one of the first reflector and the second reflector to move relative to the one of the first reflector and the second reflector.

8. The image sensing apparatus as claimed in claim 6, wherein the optical path length adjuster comprises a plurality of electrodes disposed on the first reflector and the second reflector and configured to move the other one of the first reflector and the second reflector through an electrostatic force.

9. The image sensing apparatus as claimed in claim 8, further comprising
    at least one bump, disposed on the one of the first reflector and the second reflector; and at least one elastic member, connecting the other one of the first reflector and the second reflector with the at least one bump.

10. The image sensing apparatus as claimed in claim 6, further comprising at least one elastic member connecting the other one of the first reflector and the second reflector with the fixing member.

11. The image sensing apparatus as claimed in claim 10, wherein the optical path length adjuster comprises:
   a magnetic material, disposed on the other one of the first reflector and the second reflector; and
   a coil, configured to generate a magnetic force on the magnetic material by means of applying a current through the coil, so as to move the other one of the first reflector and the second reflector.

12. The image sensing apparatus as claimed in claim 1, further comprising a spacer disposed between the first reflector and the second reflector, wherein when the gap is adjusted to have the second predetermined optical path length, both the first reflector and the second reflector are in contact with the spacer.

13. The image sensing apparatus as claimed in claim 1, wherein the gap is a liquid crystal gap filled with liquid crystal, a refractive index of the liquid crystal gap for the light signal is adapted to be switched to a first refractive index corresponding to the first predetermined optical path length or switched to a second refractive index corresponding to the second predetermined optical path length, and the optical path length adjuster comprises two electrodes located on two sides of the liquid crystal gap and configured to change the refractive index of the liquid crystal gap to the first refractive index or the second refractive index through applying a voltage.

14. The image sensing apparatus as claimed in claim 13, wherein the second refractive index is less than the first refractive index.

15. The image sensing apparatus as claimed in claim 1, wherein a center wavelength of the light having the at least one predetermined wavelength range falls in a range from 760 nm to 1200 nm.

16. The image sensing apparatus as claimed in claim 1, wherein a full width at half maximum of a spectrum of the light having the at least one predetermined wavelength range is less than 50 nm.

17. The image sensing apparatus as claimed in claim 1, wherein the wavelength selecting device is located between the at least one lens and the image sensor or between the object and the at least one lens.

18. The image sensing apparatus as claimed in claim 1, wherein the first reflector and the second reflector comprise distributed Bragg reflective mirrors.

19. The image sensing apparatus as claimed in claim 1, wherein when the gap is adjusted to have the first predetermined optical path length and when the gap is adjusted to have the second predetermined optical path length, a transmittance of the wavelength selecting device for visible light is greater than or equal to 80%.

20. The image sensing apparatus as claimed in claim 1, wherein when the gap is adjusted to have the first predetermined optical path length, the transmittance of the wavelength selecting device for the near infrared light is less than 10%.

21. The image sensing apparatus as claimed in claim 1, wherein when the gap is adjusted to have the second predetermined optical path length, a peak value of the transmittance of the wavelength selecting device for the light having the at least one predetermined wavelength range is greater than 30%.

* * * * *